US008743710B2

(12) United States Patent  (10) Patent No.: US 8,743,710 B2
Terry  (45) Date of Patent: Jun. 3, 2014

(54) METHOD AND APPARATUS FOR DYNAMICALLY ADJUSTING DATA TRANSMISSION PARAMETERS AND CONTROLLING H-ARQ PROCESSES

(75) Inventor: Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 895 days.

(21) Appl. No.: 12/539,186

(22) Filed: Aug. 11, 2009

(65) Prior Publication Data

US 2009/0323592 A1  Dec. 31, 2009

Related U.S. Application Data

(62) Division of application No. 11/140,034, filed on May 27, 2005, now Pat. No. 7,584,397.

(60) Provisional application No. 60/578,728, filed on Jun. 10, 2004.

(51) Int. Cl.
H04L 12/26 (2006.01)
H04J 3/24 (2006.01)
G06C 25/02 (2006.01)

(52) U.S. Cl.
USPC ............................ 370/252; 370/474; 714/748

(58) Field of Classification Search
None
See application file for complete search history.

(56) References Cited

U.S. PATENT DOCUMENTS 5,490,168 A 2/1996 Phillips et al.
6,671,284 B1 12/2003 Yonge, III et al.
6,697,986 B2 2/2004 Kim et al.
6,731,623 B2 5/2004 Lee et al.
6,735,180 B1 5/2004 Malkamaki et al.
6,747,967 B2 6/2004 Marinier (Continued)

FOREIGN PATENT DOCUMENTS

EP 0 951 198 10/1999
JP 2003-304291 10/2003

(Continued)

OTHER PUBLICATIONS

3GPP, "3$^{rd}$ Generation Partnership Project; Technical Specification Group Radio Access Network; FDD Enhanced Uplink; Overall Description; Stage 2 (Release 6)," 3GGP TS 25.309 V6.2.0, (Mar. 2005).

(Continued)

Primary Examiner — Steven H Nguyen
(74) Attorney, Agent, or Firm — Volpe and Koenig, P.C.

(57) ABSTRACT

In a wireless communication system including a wireless transmit/receive unit (WTRU) which transfers data to a Node-B, data transmission parameters such as modulation and coding scheme (MCS) and transport block set (TBS) size are dynamically adjusted on a transmission time interval (TTI) basis, and hybrid-automatic repeat request (H-ARQ) processes used to control the transfer of data between the WTRU and the Node-B are initiated and released, as required. The WTRU transmits and retransmits data to the Node-B through an enhanced uplink (EU) dedicated channel (E-DCH) in accordance with data feedback information received from the Node-B. The WTRU queues data for transmission, and determines a transmission status of the data. The transmission status is set to one of "new transmission," "successful transmission," "retransmission" and "restarted transmission." For each TTI, the WTRU initiates an EU transmission to the Node-B which identifies the assigned H-ARQ process, TBS size and MCS.

10 Claims, 4 Drawing Sheets

(56) References Cited

U.S. PATENT DOCUMENTS

| | | | |
|---|---|---|---|
| 6,751,234 | B1 | 6/2004 | Ono |
| 6,934,556 | B2 | 8/2005 | Takano |
| 6,999,432 | B2* | 2/2006 | Zhang et al. .................. 370/328 |
| 7,079,489 | B2* | 7/2006 | Massie et al. ................. 370/236 |
| 7,206,332 | B2 | 4/2007 | Kwan et al. |
| 7,257,423 | B2* | 8/2007 | Iochi ............................ 455/561 |
| 7,292,854 | B2* | 11/2007 | Das et al. ...................... 455/434 |
| 7,309,111 | B2 | 12/2007 | Herges et al. |
| 7,392,460 | B2* | 6/2008 | Kim et al. ..................... 714/781 |
| 7,522,526 | B2 | 4/2009 | Yi et al. |
| 7,584,397 | B2* | 9/2009 | Terry ............................ 714/748 |
| 7,631,247 | B2* | 12/2009 | Petrovic et al. ............... 714/776 |
| 8,280,424 | B2 | 10/2012 | Sarkkinen et al. |
| 2002/0001296 | A1 | 1/2002 | Lee et al. |
| 2002/0009999 | A1 | 1/2002 | Lee et al. |
| 2002/0154612 | A1* | 10/2002 | Massie et al. ................. 370/329 |
| 2002/0191544 | A1 | 12/2002 | Cheng et al. |
| 2003/0074476 | A1* | 4/2003 | Kim et al. ..................... 709/246 |
| 2003/0086391 | A1 | 5/2003 | Terry et al. |
| 2003/0092458 | A1 | 5/2003 | Kuo |
| 2003/0152062 | A1 | 8/2003 | Terry et al. |
| 2003/0157953 | A1* | 8/2003 | Das et al. ...................... 455/522 |
| 2003/0235162 | A1 | 12/2003 | Chao et al. |
| 2004/0002342 | A1 | 1/2004 | Goldberg et al. |
| 2004/0009786 | A1 | 1/2004 | Terry |
| 2004/0063426 | A1 | 4/2004 | Hunkeler |
| 2004/0100918 | A1 | 5/2004 | Toskala et al. |
| 2004/0190523 | A1 | 9/2004 | Gessner et al. |
| 2004/0228313 | A1* | 11/2004 | Cheng et al. .................. 370/342 |
| 2005/0047393 | A1* | 3/2005 | Liu ............................... 370/352 |
| 2005/0180371 | A1* | 8/2005 | Malkamaki ................... 370/342 |
| 2005/0250540 | A1* | 11/2005 | Ishii et al. ..................... 455/561 |
| 2008/0137577 | A1 | 6/2008 | Habetha |

FOREIGN PATENT DOCUMENTS

| | | |
|---|---|---|
| KR | 2003-0068743 | 8/2003 |
| KR | 2003-0088614 | 11/2003 |
| RU | 2005120874 | 1/2007 |
| RU | 2006126636 | 1/2008 |
| WO | 00/49760 | 8/2000 |
| WO | 01/31854 | 3/2001 |
| WO | 03/003643 | 1/2003 |
| WO | 03/069818 | 8/2003 |
| WO | 2004/042954 | 5/2004 |

OTHER PUBLICATIONS

3GPP2 C.20003-C, "Medium Access Control (MAC) Standard for cdma2000 Spread Spectrum Systems", 3$^{rd}$ Generation Partnership Project 2 "3GPP2", Version 2.0, Release C, Aug. 2004.

3GPP, "3rd Generation Partnership Project; Technical Specification Group Radio Access Network; Physical channels and mapping of transport channels onto physical channels (FDD) (Release 1999)," 3GPP TS 25.211 V3.12.0 (Sep. 2002).

3GPP, "3$^{rd}$ Generation Partnership Project; Technical Specification Group Radio Access Network; FDD Enhanced Uplink; Overall Description; Stage 2 (Release 6)," 3GPP TS 25.309 V6.2.0, (Mar. 2005).

3GPP, "3$^{rd}$ Generation Partnership Project; Technical Specification Group Radio Access Network; Medium Access Control (MAC) Protocol Specification (Release 1999)," 3GPP TS 25.321 V3.16.0, (Sep. 2003).

3GPP, "3$^{rd}$ Generation Partnership Project; Technical Specification Group Radio Access Network; Medium Access Control (MAC) Protocol Specification (Release 1999)," 3GPP TS 25.321 V3.17.0, (Jun. 2004).

3GPP, "3$^{rd}$ Generation Partnership Project; Technical Specification Group Radio Access Network; Medium Access Control (MAC) Protocol Specification (Release 5)," 3GPP TS 25.321 V5.10.0, (Dec. 2004).

3GPP, "3$^{rd}$ Generation Partnership Project; Technical Specification Group Radio Access Network; Medium Access Control (MAC) Protocol Specification (Release 5)," 3GPP TS 25.321 V5.8.0, (Mar. 2004).

3GPP, "3$^{rd}$ Generation Partnership Project; Technical Specification Group Radio Access Network; Medium Access Control (MAC) Protocol Specification (Release 4)," 3GPP TS 25.321 V4.10.0, (Jun. 2004).

3GPP, "3$^{rd}$ Generation Partnership Project; Technical Specification Group Radio Access Network; Medium Access Control (MAC) Protocol Specification (Release 4)," 3GPP TS 25.321 V4.9.0, (Sep. 2003).

3GPP, "3rd Generation Partnership Project; Technical Specification Group Radio Access Network; Physical channels and mapping of transport channels onto physical channels (FDD) (Release 4)," 3GPP TS 25.211 V4.6.0 (Sep. 2002).

3GPP, "3rd Generation Partnership Project; Technical Specification Group Radio Access Network; Physical channels and mapping of transport channels onto physical channels (FDD) (Release 5)," 3GPP TS 25.211 V5.5.0 (Sep. 2003).

3GPP, "3rd Generation Partnership Project; Technical Specification Group Radio Access Network; Physical channels and mapping of transport channels onto physical channels (FDD) (Release 6)," 3GPP TS 25.211 V6.0.0 (Dec. 2003).

3GPP, "3rd Generation Partnership Project; Technical Specification Group Radio Access Network; Physical channels and mapping of transport channels onto physical channels (FDD) (Release 5)," 3GPP TS 25.211 V5.6.0 (Sep. 2004).

3GPP, "3rd Generation Partnership Project; Technical Specification Group Radio Access Network; Physical channels and mapping of transport channels onto physical channels (FDD) (Release 6)," 3GPP TS 25.211 V6.4.0 (Mar. 2005).

3GPP, "3rd Generation Partnership Project; Technical Specification Group Radio Access Network; Multiplexing and channel coding (FDD) (Release 6)," 3GPP TS 25.212 V6.4.0 (Mar. 2005).

3GPP, "3rd Generation Partnership Project; Technical Specification Group Radio Access Network; Multiplexing and channel coding (FDD) (Release 6)," 3GPP TS 25.212 V6.1.0 (Mar. 2004).

3GPP, "3rd Generation Partnership Project; Technical Specification Group Radio Access Network; Multiplexing and channel coding (FDD) (Release 5)," 3GPP TS 25.212 V5.9.0 (Jun. 2004).

3GPP, "3rd Generation Partnership Project; Technical Specification Group Radio Access Network; Multiplexing and channel coding (FDD) (Release 1999)," 3GPP TS 25.212 V3.11.0 (Sep. 2002).

3GPP, "3rd Generation Partnership Project; Technical Specification Group Radio Access Network; Multiplexing and channel coding (FDD) (Release 5)," 3GPP TS 25.212 V5.8.0 (Mar. 2004).

3GPP, "3rd Generation Partnership Project; Technical Specification Group Radio Access Network; Multiplexing and channel coding (FDD) (Release 4)," 3GPP TS 25.212 V4.6.0 (Sep. 2002).

3GPP, "3$^{rd}$ Generation Partnership Project; Technical Specification Group Radio Access Network; Radio Resource Control (RRC) protocol specification (Release 1999)," 3GPP TS 25.331 V3.18.0 (Mar. 2004).

3GPP, "3$^{rd}$ Generation Partnership Project; Technical Specification Group Radio Access Network; Radio Resource Control (RRC) protocol specification (Release 1999)," 3GPP TS 25.331 V3.21.0 (Dec. 2004).

3GPP, "3$^{rd}$ Generation Partnership Project; Technical Specification Group Radio Access Network; Radio Resource Control (RRC); Protocol Specification (Release 4)," 3GPP TS 25.331 V4.13.0 (Mar. 2004).

3GPP, "3rd Generation Partnership Project; Technical Specification Group Radio Access Network; Radio Resource Control (RRC); Protocol Specification (Release 4)," 3GPP TS 25.331 V4.17.0 (Mar. 2005).

3GPP, "3rd Generation Partnership Project; Technical Specification Group Radio Access Network; Radio Resource Control (RRC); Protocol Specification (Release 5)," 3GPP TS 25.331 V5.8.0 (Mar. 2004).

3GPP, "3rd Generation Partnership Project; Technical Specification Group Radio Access Network; Radio Resource Control (RRC); Protocol Specification (Release 5)," 3GPP TS 25.331 V5.12.1 (Mar. 2005).

(56) References Cited

OTHER PUBLICATIONS

3GPP, "3rd Generation Partnership Project; Technical Specification Group Radio Access Network; Radio Resource Control (RRC); Protocol Specification (Release 6)," 3GPP TS 25.331 V6.1.0 (Mar. 2004).

3GPP, "3rd Generation Partnership Project; Technical Specification Group Radio Access Network; Radio Resource Control (RRC); Protocol Specification (Release 6)," 3GPP TS 25.331 V6.5.0 (Mar. 2005).

3GPP, "3rd Generation Partnership Project; Technical Specification Group Radio Access Network; Medium Access Control (MAC) protocol specification (Release 6)," 3GPP TS 25.321 V6.1.0 (Mar. 2004).

3GPP, "3rd Generation Partnership Project; Technical Specification Group Radio Access Network; Medium Access Control (MAC) protocol specification (Release 6)," 3GPP TS 25.321 V6.4.0 (Mar. 2005).

3GPP2 C.S0003-C, "Medium Access Control (MAC) Standard for cdma2000 Spread Spectrum Systems", 3rd Generation Partnership Project 2 "3GPP2", Version 2.0, Release C, Aug. 2004.

3GPP2 C.S0002-C, "Physical Layer Standard for cdma2000 Spread Spectrum Systems", 3rd Generation Partnership Project 2 "3GPP2", Version 2.0, Revision C, Jul. 23, 2004.

3GPP2 C.S0004-C, "Signaling Link Access Control (LAC) Standard for cdma2000 Spread Spectrum Systems", 3rd Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3rd Generation Partnership Project 2 "3GPP2", Version 2.0, Revision c, Jul. 23, 2004.

Dottling et al., "Hybrid ARQ and Adaptive Modulation and Coding Schemes for High Speed Downlink Packet Access," The 13th IEEE International Symposium on Personal, Indoor and Mobile Radio Communications, vol. 3, pp. 1073-1077 (Sep. 2002).

Ghosh et al., "Overview of Enhanced Uplink for 3GPP W-CDMA," 2004 IEEE 59th Vehicular Technology Conference, VTC 2004-Spring, (May 17-19, 2004).

Rosa et al., "Performance of fast Node B scheduling and L1 HARQ schemes in WCDMA uplink packet access," IEEE 59th Vehicular Technology Conference, vol. 3, pp. 1635-1639 (May 17-19, 2004).

Yoon et al., "Throughput Bound of CDMA Unslotted ALOHA with Hybrid Type II ARQ using Rate Compatible Punctured Turbo Codes," IEEE Global Telecommunications Conference, vol. 4, (Dec. 1-5, 2003).

Lucent Technologies, "Signalling for H-ARQ Operation," 3GPP TSG-WG1#31, R1-03-0285 (Feb. 18-21, 2003).

3GPP, "3rd Generation Partnership Project; Technical Specification Group Radio Access Network; Feasibility Study for Enhanced Uplink for UTRA FDD (Release 6)," 3GPP TR 25.896 V6.0.0 (Mar. 2004).

* cited by examiner

METHOD AND APPARATUS FOR DYNAMICALLY ADJUSTING DATA TRANSMISSION PARAMETERS AND CONTROLLING H-ARQ PROCESSES

CROSS REFERENCE TO RELATED APPLICATION

This application is a divisional of U.S. patent application Ser. No. 11/140,034 filed May 27, 2005, which claims the benefit of U.S. Provisional Application No. 60/578,728 filed Jun. 10, 2004, which are incorporated by reference as if fully set forth.

FIELD OF INVENTION

The present invention is related to a wireless communication system including a wireless transmit/receive unit (WTRU) and a Node-B. More particularly, the present invention is related to a method and apparatus for dynamically adjusting data transmission parameters such as modulation and coding scheme (MCS) and transport block set (TBS) size, and assigning and releasing a hybrid-automatic repeat request (H-ARQ) process used to control the transfer of data between the WTRU and the Node-B.

BACKGROUND

In 3rd generation cellular systems, adaptive modulation and coding (AM&C) and H-ARQ schemes are being investigated for incorporation into an enhanced uplink (EU) operation designed to offer low transmission latency, higher throughput, and more efficient use of physical resources.

The AM&C scheme allows an MCS to be dynamically adjusted on a transmit time interval (TTI) basis whereby, for each TTI, the MCS is selected to make the most efficient use of radio resources and to provide the highest possible data rates. A less robust MCS uses less physical resources, but is more vulnerable to errors. A more robust MCS uses more physical resources, but offers greater protection against errors.

The H-ARQ scheme is used to generate transmissions and retransmissions with low latency. A primary aspect of the H-ARQ scheme is that data received in failed transmissions can be soft combined with successive retransmissions to increase the probability of successful reception. Either Chase Combining (CC) or incremental redundancy (IR) may be applied. When CC is applied, the same MCS is chosen for the retransmission. When IR is applied, a more robust MCS is used in each retransmission.

SUMMARY

The present invention is implemented in a wireless communication system including a WTRU which transfers data to a Node-B. Data transmission parameters such as TBS size are dynamically adjusted on a TTI basis. Optionally, MCS may also be adjusted. An H-ARQ process used to control the transfer of data between the WTRU and the Node-B is assigned and released, as required. The WTRU transmits and retransmits data to the Node-B through an enhanced uplink (EU) dedicated channel (E-DCH) in accordance with feedback information received from the Node-B. The WTRU queues data for transmission, and determines a transmission status of the data. The transmission status is set by a controller in the WTRU to one of "new transmission," "successful transmission," "retransmission" and "restarted transmission." For each TTI, the WTRU initiates an EU transmission to the Node-B which identifies either explicitly or implicitly the retransmission number, new data indication, assigned H-ARQ process, TBS size and optionally MCS.

The transmission status of data is set by the controller in the WTRU to "new transmission" when the data is new data, to "successful transmission" when an acknowledge (ACK) message is received from the Node-B, to "retransmission" when a non-acknowledge (NACK) message or no response is received from the Node-B in response to the transmission of the new data, and optionally to "restarted transmission" when a retransmission count exceeds a predetermined maximum number of retransmissions.

If the transmission status is "new transmission", an initial H-ARQ process is assigned. If the transmission status is "retransmission", the same H-ARQ process is assigned while incrementing the retransmission counter. If the transmission status is "successful transmission", the H-ARQ process is released. If the transmission status is "restarted transmission", which is optional, an H-ARQ process is assigned while initializing the retransmission counter and incrementing a new data indicator (NDI).

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
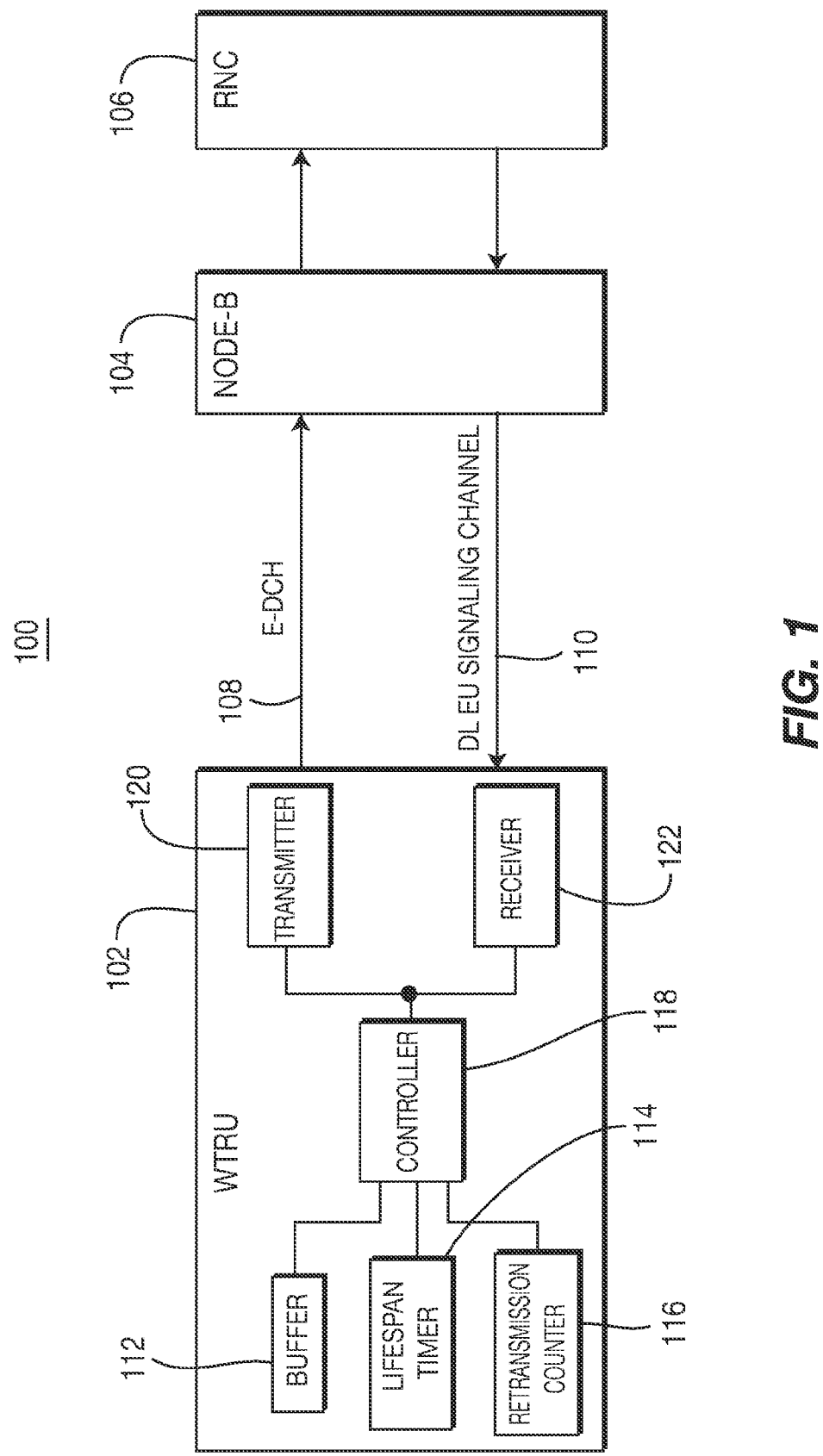
FIG. 1 is a block diagram of a wireless communication system operating in accordance with the present invention.

FIG. 1 is a block diagram of a wireless communication system 100 operating in accordance with the present invention. The system 100 comprises a WTRU 102, a Node-B 104, and a radio network controller (RNC) 106. The WTRU 102 transmits data through an E-DCH 108 with a transmitter 120 and receives feedback with a receiver 122 from the Node-B 104 through a downlink (DL) signaling channel 110 based on an initiated H-ARQ process. When the Node-B 104 fails to decode the data sent by the WTRU 102, the Node-B 104 transmits a NACK message to the WTRU 102 via the DL signaling channel 110 or does not transmit feedback which is interpreted as a NACK by the WTRU 102. When the Node-B 104 succeeds to decode the data sent by the WTRU 102, the Node-B 104 transmits an ACK message to the WTRU 102 which releases the H-ARQ process for other transmissions. The H-ARQ processes may either be designed to implement CC or IR. The RNC 106 controls overall operation of data transfers that occur between the Node-B 104 and the WTRU 102, including radio resources allocation. The WTRU 102 includes a data buffer 112 for storing E-DCH data, an optional data lifespan timer 114 used to determine whether it is necessary to discard expired data, and a retransmission counter 116 used to determine whether data transmitted by the WTRU 102 but not received by the Node-B 104 should be retransmitted or whether H-ARQ transmission should be terminated or optionally restarted. The buffer 112, the lifespan timer 114 and the retransmission counter 116 are controlled by a controller 118. The controller 118 sets, (i.e., keeps track of), the status of each transmission associated with an H-ARQ process.

Figure 2:
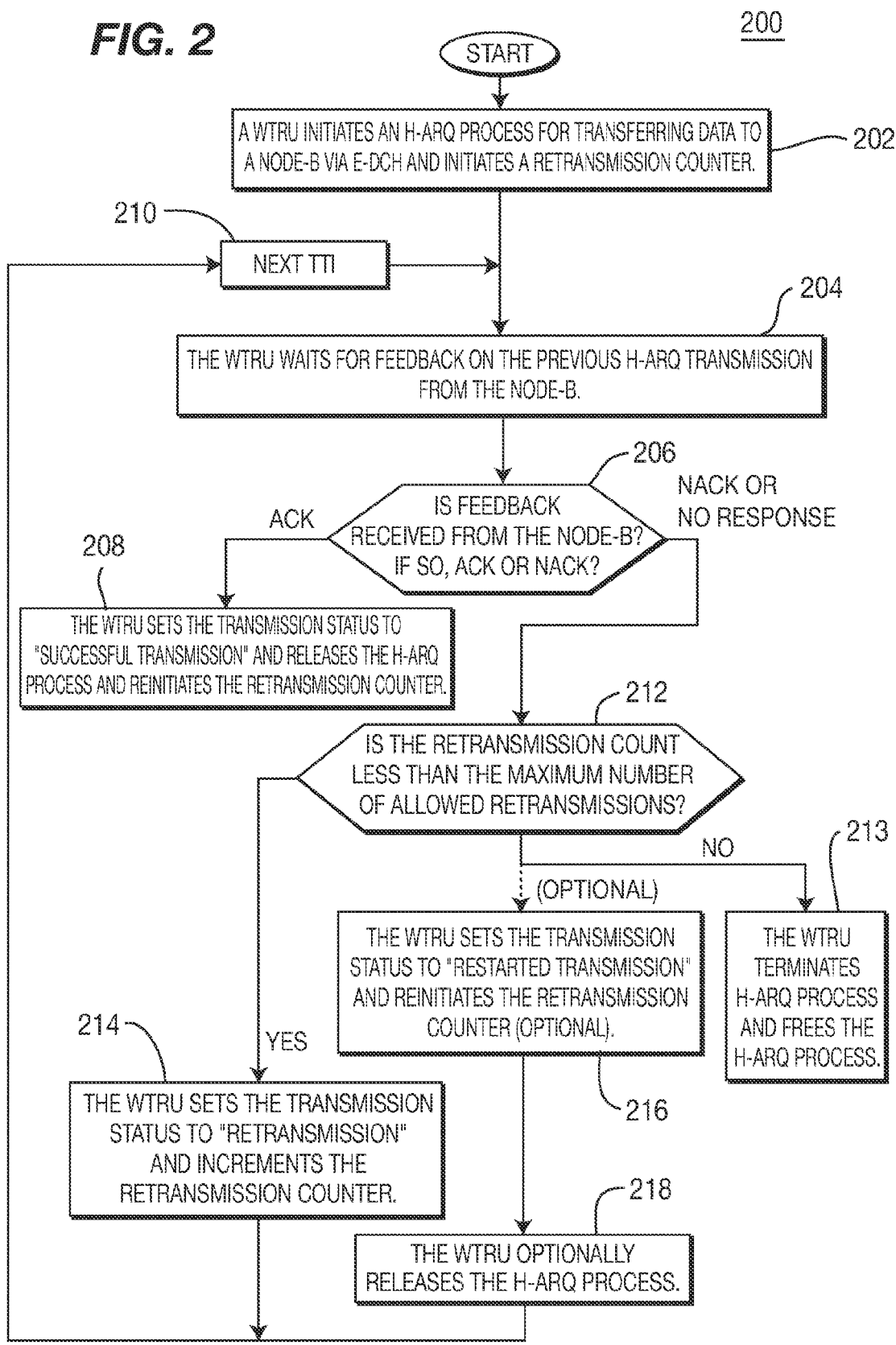
FIG. 2 is a flow diagram of a process for initiating and releasing H-ARQ processes in accordance with the present invention.

FIG. 2 is a flow diagram of a process 200 including method steps for controlling an H-ARQ process in accordance with the present invention. The H-ARQ process may be either synchronous or asynchronous. In a synchronous H-ARQ operation, the WTRU 102 keeps track of when responses to data transmissions between the WTRU 102 and the Node-B 104 are expected, and the periodicity of H-ARQ retransmissions is predetermined. In an asynchronous H-ARQ operation, the WTRU 102 transmits data and waits for the feedback for a predetermined period of time.

After the WTRU 102 initiates the H-ARQ process and the retransmission counter 116, the WTRU 102 transmits data to the Node-B 104 via the E-DCH 108 during a current TTI (step 202). In step 204, the WTRU 102 waits for feedback from the Node-B 104. If the WTRU 102 receives an ACK message from the Node-B 104, the WTRU 102 then sets the transmission status to "successful transmission", releases the H-ARQ process and reinitiates the retransmission counter 116 (step 208) for subsequent data transmissions.

If, at step 206, the WTRU 102 receives a NACK message or did not receive any response, the WTRU 102 determines whether the retransmission count indicated by the retransmission counter 116 is less than or equal to the maximum number of allowed retransmissions (step 212).

If the retransmission count as determined at step 212 is less than the maximum number of allowed retransmissions, the WTRU 102 sets, or maintains, the transmission status to "retransmission" and increments the retransmission counter 116 (step 214). The retransmission counter 116 is incremented each time the same data is retransmitted by the WTRU 102.

If the retransmission count as determined at step 212 is equal to or greater than the maximum number of allowed retransmissions, the H-ARQ process transmission is terminated and reset for supporting subsequent data transmissions (step 213). Optionally the WTRU 102 may set the transmission status to "restarted transmission" and reinitiates the retransmission counter (step 216). After setting the transmission status to "restarted transmission", the WTRU 102 reinitiates the H-ARQ transmission process as a "new transmission" or the WTRU 102 may optionally release the H-ARQ process (step 218).

Figure 3:
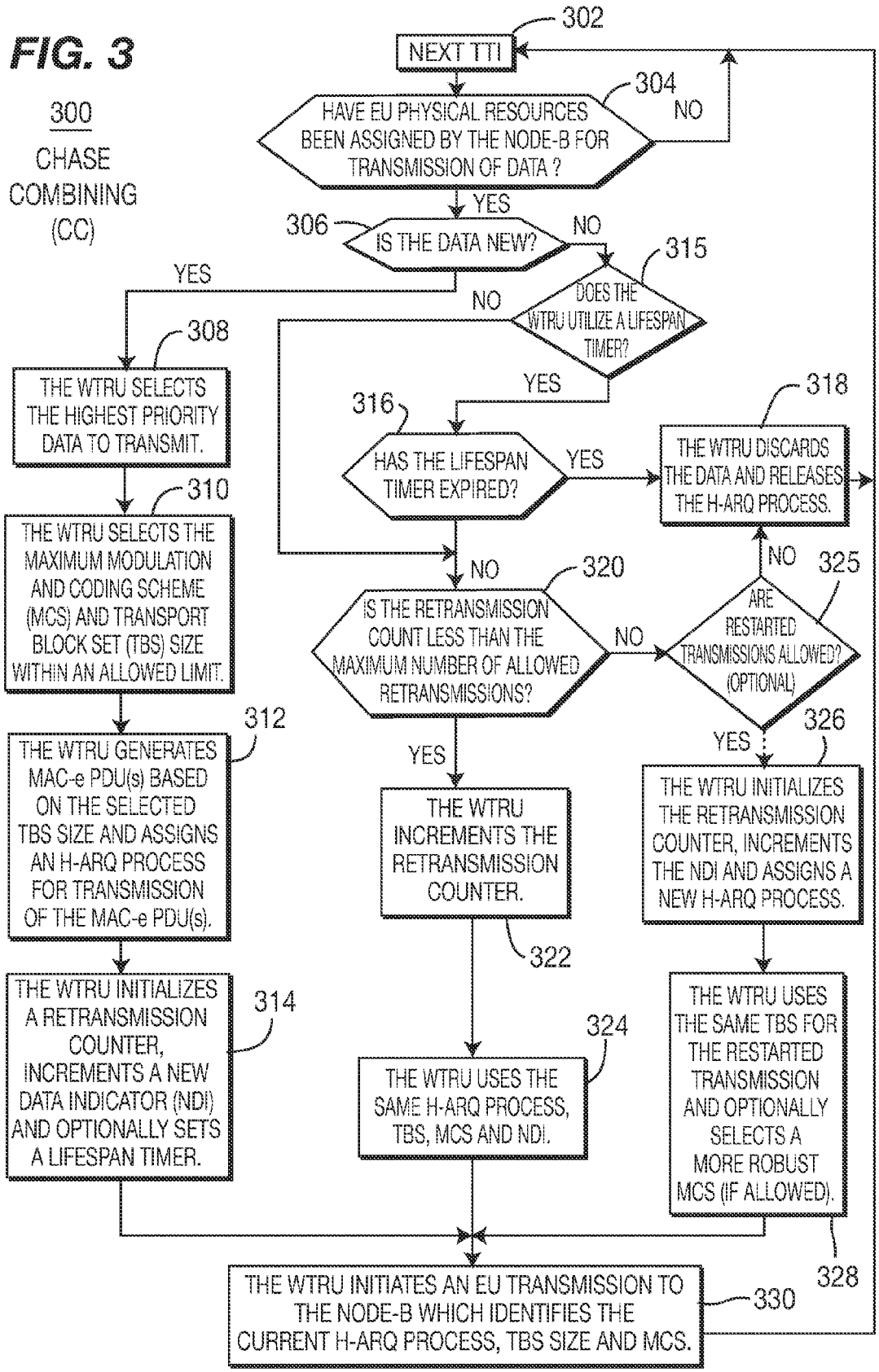
FIG. 3 is a flow diagram of a process including method steps for implementing CC in accordance with the present invention.

FIG. 3 is a flow diagram of a process 300 including method steps for implementing CC in accordance with the present invention. The process 300 is performed on a TTI basis (step 302). In step 304, the WTRU 102 determines whether EU physical resources have been assigned by the Node-B 104 and whether an H-ARQ process is available for the WTRU 102 to transmit data to the Node-B 104 via the E-DCH 108. If EU physical resources have not been assigned, the WTRU 102 waits for the allocation of EU physical resources and the transmission of data is delayed until the next TTI (step 302). If EU physical resources have been allocated and an H-ARQ process is available, the WTRU 102 determines whether the data is new data (step 306). If the data is determined to be new data in step 306, the WTRU 102 selects the highest priority data to transmit (step 308). Additionally, the WTRU 102 selects the MCS and TBS size that maximizes transmission of the highest priority data within an allowed limit (step 310). TBS size is chosen based on the Node-B 104 signaled maximum MCS and TBS size, transmit power available for the E-DCH 108, MCS, and the data available in the buffer 112 for transmission.

For each transport channel (TrCH), dedicated channel medium access control (MAC-d) flow or logical channel, a list of allowed TBS sizes, a retransmission limit and allowed transmission latency, (i.e., MAC data "lifespan"), are determined. The allowable MCS and TBS sizes are the maximum that the WTRU 102 is allowed to transmit for the current physical resources allocation period. The configuration is either signaled from the RNC 106 in accordance with radio resource control (RRC) procedures or uniquely specified by a standard. The chosen MCS and TBS size may be either explicitly signaled (preferably from the Node-B) or derived from an associated parameter such as a channel quality indicator (CQI) and/or transport format combination (TFC) index. The CQI may represent the maximum allowed WTRU interference or transmit power. The Node-B 104 may signal this information in the initial channel assignment. Alternatively, the Node-B 104 may send this information when the WTRU 102 requests additional EU channel allocations.

In step 312, the WTRU 102 then generates at least one EU MAC (MAC-e) protocol data unit (PDU) based on the selected TBS size, and assigns an H-ARQ process for transmission of the MAC-e PDU. In step 314, the WTRU 102 initializes the retransmission counter 116, increments an NDI and optionally sets the lifespan timer 114 in the WTRU 102. The NDI is used to indicate when new data is being transmitted and when the Node-B 104 needs to clear the soft buffer associated with the H-ARQ process that is being transmitted. The initial value of the retransmission counter 116 may be interpreted as a transmission of new data and, in such a case, the NDI parameter is not needed. The WTRU 102 then initiates an EU transmission to the Node-B 104 identifying the current H-ARQ process, TBS size, (if not assigned by the Node-B 104), and MCS. The H-ARQ process and MCS may be implicitly known by the Node-B 104 due to a specified H-ARQ process operation, and thus may not need to be signaled by the WTRU 102 to the Node-B 104.

When CC is supported, the TBS size information is identified to the Node-B 104 for each transmission and retransmission, unless TBS is identified by the Node-B 104 in the physical channel allocation. Retransmissions have the same MCS and TBS as applied in the initial transmission in the case of CC.

Referring back to step 306, if it is determined that the data is not new data, a determination is made as to whether the WTRU 102 utilizes the lifespan timer 114 (step 315). If the WTRU 102 utilizes the lifespan timer 114, the process 300 proceeds to step 316 to determine whether the lifespan timer 114 has expired. If the lifespan timer 114 has expired, the WTRU 102 discards the data and releases, (i.e., frees), the H-ARQ process (step 318), and the process 300 returns to step 302. Optionally, when the lifespan timer 114 is close to expiration, the WTRU 102 may use a more robust MCS to increase the probability of successful transmission.

The retransmission counter 116 in the WTRU 102 is incremented each time a data transmission is not successful and thus not acknowledged by the Node-B 104. If the lifespan timer 114 has not yet expired, or if the WTRU 102 does not utilize the lifespan timer 114, the process 300 proceeds to step 320 for retransmission of the data whereby the WTRU 102 determines whether the retransmission count is less than the maximum number of allowed retransmissions. If the retransmission count is less than the maximum number of allowed retransmissions, the status of transmission is set to or maintained as "retransmission," the WTRU 102 increments the retransmission counter 116 (step 322) and uses the same H-ARQ process, TBS, MCS and NDI, (if not incorporated with the retransmission counter) (step 324). The WTRU 102 then initiates an EU transmission to the Node-B 104 identifying the H-ARQ process, (this may be implicitly known and may not need be signaled to the Node-B), TBS size (if not assigned by the Node-B), and MCS in the associated physical control channel (step 330).

If the retransmission count reaches or exceeds the maximum number of allowed retransmissions, the process 300 proceeds to step 318 to discard the data and release the H-ARQ process. Alternatively, if restarted transmissions are determined to be allowed in optional step 325, the status of transmission is set to "restarted transmission," and the WTRU 102 initializes the retransmission counter 116, increments the NDI and assigns a new H-ARQ process (step 326). If the previously transmitted data stored in the soft combining buffer is disrupting successive retransmissions, it is better to clear the soft buffer and restart the H-ARQ transmission to increase the probability of successful transmission. Therefore, when the maximum number of retransmissions for a particular H-ARQ process is reached, the NDI, (or an initialized retransmission count), is sent to indicate that the H-ARQ transmissions have been restarted. When the Node-B 104 receives the incremented NDI, (or the transmission count set to the initial value), the Node-B 104 clears the soft combining buffer of the previously received data.

In step 328, a new H-ARQ transmission is initiated using the same TBS and, optionally, a more robust MCS may be selected for the "new transmission" to increase the probability of successful delivery (step 328). In order to allow this change in MCS, the TBS may be segmented into several independent transmissions. In the case a transmission is being reinitiated with more redundancy (either by change of MCS or just less puncturing) the previous TBS may no longer fit in the allocated physical resource. In this case the original transmission may be segmented into multiple separate transmissions that do not exceed the requirement. The WTRU 102 then initiates an EU transmission to the Node-B which identifies the current H-ARQ process, (may be implicitly known to the Node-B), TBS size and MCS, (if not assigned by the Node-B), in the associated physical control channel (step 330).

Figure 4:
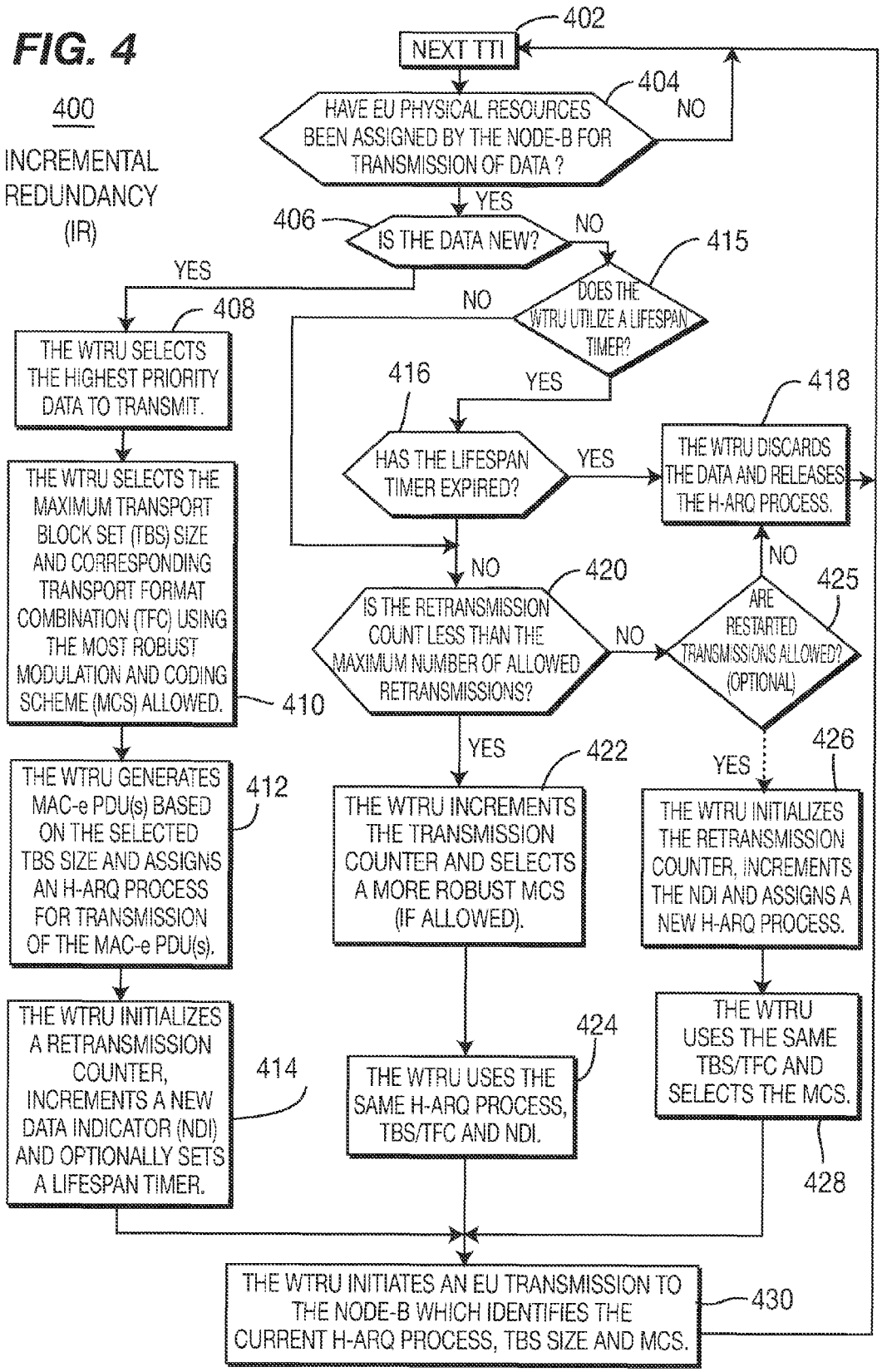
FIG. 4 is a flow diagram of a process including method steps for implementing IR in accordance with the present invention.

FIG. 4 is a flow diagram of a process 400 including method steps for implementing IR in accordance with the present invention. The process 400 is performed on a TTI basis (step 402). In step 404, the WTRU 102 determines whether EU physical resources have been assigned by the Node-B 104 and whether an H-ARQ process is available for the WTRU 102 to transmit data to the Node-B 104 via the E-DCH 108 (step 404). If EU physical resources have not been assigned, the WTRU 102 waits for the allocation of EU physical resources and the transmission of data is delayed until the next TTI (step 402). If EU physical resources have been allocated and an H-ARQ process is available, the WTRU 102 determines whether the data is new data (step 406). If the data is determined to be new data in step 406, the WTRU 102 selects the highest priority data to transmit (step 408). Additionally, the WTRU 102 selects the maximum TBS size and corresponding TFC maximizing transmission of the highest priority data using the most robust MCS allowed (step 410).

In step 412, the WTRU 102 then generates at least one MAC-e PDU based on the selected TBS size, and assigns an H-ARQ process for transmission of the MAC-e PDU. In step 414, the WTRU 102 initializes the retransmission counter 116, increments an NDI and optionally sets the lifespan timer 114 in the WTRU 102 (step 414). The NDI is used to indicate when new data is being transmitted and when the Node-B 104 needs to clear the soft buffer associated with the H-ARQ process that is being transmitted. The initial value of the retransmission counter 116 may be interpreted as a transmission of new data and, in such a case, the NDI parameter is not needed. The WTRU 102 then initiates EU transmission to the Node-B 104 identifying the current H-ARQ process, TBS size and MCS in the associated physical control channel (step 430). The H-ARQ process and MCS may be implicitly known by the Node-B 104 due to a specified H-ARQ process operation, and thus may not need to be signaled by the WTRU 102 to the Node-B 104.

Referring back to step 406, if it is determined that the data is not new data, a determination is made as to whether the WTRU 102 utilizes the lifespan timer 114 (step 415). If the WTRU 102 utilizes the lifespan timer 114, the process 400 proceeds to step 416 to determine whether the lifespan timer 114 has expired. If the lifespan timer 114 has expired, the WTRU 102 discards the data and releases, (i.e., frees), the H-ARQ process (step 418), and the process 400 returns to step 402. Optionally, when the lifespan timer 114 is close to expiration, the WTRU 102 may use a more robust MCS to increase the probability of successful transmission.

The retransmission counter 116 in the WTRU 102 is incremented each time a data transmission is not successful and thus not acknowledged by the Node-B 104. If the lifespan timer 114 has not yet expired, or if the WTRU 102 does not utilize the lifespan timer 114, the process 400 proceeds to step 420 for retransmission of the data whereby the WTRU 102 determines whether the retransmission count is less than the maximum number of allowed retransmissions. If the retransmission count is less than the maximum number of allowed retransmissions, the status of transmission is set to or maintained as "retransmission," and the WTRU 102 increments the retransmission counter 116 and selects a more robust MCS, if allowed (step 422). In step 424, the WTRU 102 uses the same H-ARQ process, TBS/TFC and NDI.

For IR, determination of the MCS and TBS size takes into account support of the most robust MCS, what is required by the data which is ready to transmit in the WTRU 102, and available WTRU transmit power. With each retransmission, a more robust MCS may be chosen for the same TBS. The initial transmissions with less robust MCS allow for a larger TBS size, but this size is restricted so that the same TBS can still be supported by the most robust MCS. Also, for determination of the TBS, the WTRU available transmit power for EU must be taken into account the most robust MCS allowed, even though the most robust MCS may not be required for successful transmission.

If the retransmission count reaches or exceeds the maximum, the process 400 proceeds to step 418 to discard the data and release the H-ARQ process. Alternatively, if restarted transmissions are determined to be allowed in step 425, the status of transmission is set to "restarted transmission," and the WTRU 102 initializes the retransmission counter 116, increments the NDI and assigns a new H-ARQ process (step 426). In step 428, the same TBS/TFC is used and an MCS is selected.

Although the features and elements of the present invention are described in the preferred embodiments in particular combinations, each feature or element can be used alone without the other features and elements of the preferred embodiments or in various combinations with or without other features and elements of the present invention.

While the present invention has been described in terms of the preferred embodiment, other variations which are within the scope of the invention as outlined in the claims below will be apparent to those skilled in the art.

What is claimed is:

1. A wireless transmit/receive unit (WTRU) comprising:
at least one circuit configured to receive radio resource control (RRC) configuration information from a wireless network, wherein the RRC configuration information indicates for each medium access control for dedicated channel (MAC-d) flow, a limit of a number of hybrid automatic repeat request (HARQ) retransmissions for each MAC-d flow;
wherein the at least one circuit is further configured to generate a medium access control for enhanced dedicated channel (MAC-e) protocol data unit (PDU), wherein the at least one circuit is further configured to transmit the MAC-e PDU using at least one of a plurality of synchronous HARQ processes, wherein each of the plurality of synchronous HARQ processes is configured to retransmit a MAC-e PDU that is not positively acknowledged on a condition that the limit of the number of HARQ retransmissions for a MAC-d flow of the MAC-e PDU is not reached, wherein the HARQ process that was used to previously transmit the MAC-e PDU is used to retransmit the MAC-e PDU; and
wherein the at least one circuit is further configured to transmit with the MAC-e PDU an indication of a transport block size associated with the MAC-e PDU.

2. The WTRU of claim 1 wherein the RRC configuration information further indicates allowed transport block sizes for use in generating the MAC-e PDU, and wherein the transport block size associated with the MAC-e PDU is an allowed transport block size.

3. The WTRU of claim 1 wherein the at least one circuit is further configured to initially transmit the MAC-e PDU with a variable set to zero and to increment the variable for at least one retransmission of the MAC-e PDU.

4. The WTRU of claim 1 wherein the at least one circuit is further configured to select enhanced uplink data for the MAC-e PDU to maximize transmission of highest priority data.

5. A method comprising:
receiving, by a wireless transmit/receive unit (WTRU), radio resource control (RRC) configuration information from a wireless network, wherein the RRC configuration information indicates for each medium access control for dedicated channel (MAC-d) flow, a limit of a number of hybrid automatic repeat request (HARQ) retransmissions for each MAC-d flow;
generating a medium access control for enhanced dedicated channel (MAC-e) protocol data unit (PDU); and
transmitting the MAC-e PDU using at least one of a plurality of synchronous HARQ processes of the WTRU, wherein each of the plurality of synchronous HARQ processes is configured to retransmit a MAC-e PDU that is not positively acknowledged on a condition that the limit of the number of HARQ retransmissions for a MAC-d flow of the MAC-e PDU is not reached, wherein the HARQ process that was used to previously transmit the MAC-e PDU is used to retransmit the MAC-e PDU, and wherein each MAC-e PDU is transmitted with an indication of a transport block size associated with the MAC-e PDU.

6. The method of claim 5 wherein the RRC configuration information further indicates allowed transport block sizes for use in generating the MAC-e PDU; and wherein the transport block size associated with the MAC-e PDU is an allowed transport block size.

7. The method of claim 5, further comprising:
setting a variable to zero for an initial transmission of the MAC-e PDU, and incrementing the variable for at least one retransmission of the MAC-e PDU.

8. The method of claim 5 further comprising:
selecting enhanced uplink data for the MAC-e PDU to maximize transmission of highest priority data.

9. A Node-B comprising:
at least one circuit configured to transmit a signal including a radio resource control (RRC) configuration information to a wireless transmit/receive unit (WTRU); wherein the RRC configuration information indicates for each medium access control for dedicated channel (MAC-d) flow, a limit of a number of hybrid automatic repeat request (HARQ) retransmissions for each MAC-d flow;
wherein the at least one circuit is further configured to receive from the WTRU a medium access control for enhanced dedicated channel (MAC-e) protocol data unit (PDU) using at least one of a plurality of synchronous HARQ processes, wherein the at least one circuit is configured to receive a retransmission of the MAC-e PDU, wherein the HARQ process that was used to previously receive the MAC-e PDU is used to receive the retransmission of the MAC-e PDU; and
wherein the at least one circuit is further configured to receive the MAC-e PDU with an indication of a transport block size associated with the MAC-e PDU.

10. The Node-B of claim 9 wherein the at least one circuit is further configured to receive a variable transmitted with the MAC-e PDU from the WTRU, wherein the variable is set to zero to indicate an initial transmission, and wherein the variable is incremented to a non-zero value for retransmissions.

* * * * *